United States Patent
Kikkawa et al.

(10) Patent No.: US 11,478,341 B2
(45) Date of Patent: Oct. 25, 2022

(54) INTERDENTAL CLEANING TOOL

(71) Applicant: Kobayashi Pharmaceutical Co., Ltd., Osaka (JP)

(72) Inventors: Tasuku Kikkawa, Osaka (JP); Narutomo Shiraki, Osaka (JP); Satoru Komiyama, Osaka (JP); Noboru Kusakabe, Osaka (JP); Shinji Yumei, Toyama (JP); Masanori Kawakami, Toyama (JP)

(73) Assignee: Kobayashi Pharmaceutical Co., Ltd., Osaka (JP)

(*) Notice: Subject to any disclaimer, the term of this patent is extended or adjusted under 35 U.S.C. 154(b) by 291 days.

(21) Appl. No.: 16/062,683

(22) PCT Filed: Dec. 16, 2016

(86) PCT No.: PCT/JP2016/087489
§ 371 (c)(1),
(2) Date: Jun. 15, 2018

(87) PCT Pub. No.: WO2017/104785
PCT Pub. Date: Jun. 22, 2017

(65) Prior Publication Data
US 2019/0000598 A1  Jan. 3, 2019

(30) Foreign Application Priority Data

Dec. 18, 2015  (JP) .............................. JP2015-247483

(51) Int. Cl.
*A61C 15/02* (2006.01)
*A46B 15/00* (2006.01)
(Continued)

(52) U.S. Cl.
CPC ................. *A61C 15/02* (2013.01); *A46B 1/00* (2013.01); *A46B 3/22* (2013.01); *A46B 15/0093* (2013.01); *A46B 2200/108* (2013.01)

(58) Field of Classification Search
CPC ............ A61C 15/02; A61C 15/00–048; A46B 15/0069; A46B 15/0093; A46B 1/00; A46B 3/22; A46B 2200/108; A46B 3/005
See application file for complete search history.

(56) References Cited

U.S. PATENT DOCUMENTS

| | | | | | |
|---|---|---|---|---|---|
| 6,158,444 | A | * | 12/2000 | Weihrauch | ............. A61C 15/02 132/200 |
| 2015/0114428 | A1 | * | 4/2015 | Kato | ................... B29C 45/2669 132/329 |

(Continued)

FOREIGN PATENT DOCUMENTS

| JP | 2012-095868 A | | 5/2012 |
|---|---|---|---|
| JP | 2012095868 A | * | 5/2012 |

(Continued)

OTHER PUBLICATIONS

"WO2014065368_Machine Tanslation" is a machine translation of WO-2014065368-A1. (Year: 2014).*

(Continued)

*Primary Examiner* — Larissa Rowe Emrich
(74) *Attorney, Agent, or Firm* — Wolf, Greenfield & Sacks, P.C.

(57) ABSTRACT

An interdental cleaning tool (1) comprises a base (10) having a shaft (20) that has a shape to be inserted into an interdental space, wherein the base (10) is formed of a composite material comprising a synthetic resin, a reinforcement material and a low-hardness resin having a lower hardness than the hardness of the synthetic resin.

6 Claims, 14 Drawing Sheets

(51) Int. Cl.
*A46B 1/00* (2006.01)
*A46B 3/22* (2006.01)

(56) References Cited

U.S. PATENT DOCUMENTS

2015/0335141 A1\* 11/2015 Schar ................ A46B 15/0093
15/106
2017/0105821 A1\* 4/2017 Kato .................... A46D 1/0207

FOREIGN PATENT DOCUMENTS

| JP | 2015-204905 A | 11/2015 | |
|----|----|----|----|
| WO | WO 2013/176297 A1 | 11/2013 | |
| WO | WO 2014/065368 A1 | 5/2014 | |
| WO | WO-2014065368 A1 \* | 5/2014 | .............. A46B 1/00 |
| WO | WO 2015/147076 A1 | 10/2015 | |

OTHER PUBLICATIONS

"JP2012095868_Machine Translation" is a machine translation of JP-2012095868-A. (Year: 2012).\*
Engineering Design Handbook—Discontinuous Fiberglass Reinforced Thermoplastics: (DARCOM-P 706-314)—2.1 Introduction. U.S. Army Materiel Command. Retrieved from https://app.knovel.com/hotlink/pdf/id:kt00ACVZKT/engineering-design-handbook-16/glass-fiber-introduction (Year: 1981).\*
International Search Report for International Application No. PCT/JP2016/087489, dated Feb. 21, 2017.
Written Opinion for International Application No. PCT/JP2016/087489, dated Feb. 21, 2017.

\* cited by examiner

Fig. 6

|  | EXAMPLE 1 | COMPARATIVE EXAMPLE 1 |
|---|---|---|
| POLYPROPYLENE | 86.5 | 90 |
| GLASS FIBER | 10 | 10 |
| GLASS FLAKES | - | - |
| WOLLASTONITE | - | - |
| STYRENE ELASTOMER | 3.5 | - |
| FLEXIBILITY RATIO (BASED ON THE FLEXIBILITY OF THE COMPARATIVE EXAMPLE BEING EXPRESSED AS 100) | 105 | 100 |
| BUCKLING STRENGTH (EVALUATION) | ○ | ○ |
| DETACHABILITY (SENSORY) | 7 | 7 |
| GATE MARK (SENSORY) | ○ | ○ |

Fig. 7

|  | EXAMPLE 2 | COMPARATIVE EXAMPLE 2 |
|---|---|---|
| POLYPROPYLENE | 76.5 | 80 |
| GLASS FIBER | 20 | 20 |
| GLASS FLAKES | - | - |
| WOLLASTONITE | - | - |
| STYRENE ELASTOMER | 3.5 | - |
| FLEXIBILITY RATIO (BASED ON THE FLEXIBILITY OF THE COMPARATIVE EXAMPLE BEING EXPRESSED AS 100) | 105 | 100 |
| BUCKLING STRENGTH (EVALUATION) | ◎ | ◎ |
| DETACHABILITY (SENSORY) | 8 | 8 |
| GATE MARK (SENSORY) | ○ | ○ |

Fig. 8

|  | EXAMPLE 3 | EXAMPLE 4 | EXAMPLE 5 | COMPARATIVE EXAMPLE 3 |
|---|---|---|---|---|
| POLYPROPYLENE | 66.5 | 69 | 60 | 70 |
| GLASS FIBER | 30 | 30 | 30 | 30 |
| GLASS FLAKES | - | - | - | - |
| WOLLASTONITE | - | - | - | - |
| STYRENE ELASTOMER | 3.5 | 1 | 10 | - |
| FLEXIBILITY RATIO (BASED ON THE FLEXIBILITY OF THE COMPARATIVE EXAMPLE BEING EXPRESSED AS 100) | 105 | 103 | 107 | 100 |
| BUCKLING STRENGTH (EVALUATION) | ◎ | ◎ | ◎ | ◎ |
| DETACHABILITY (SENSORY) | 9 | 9 | 9 | 9 |
| GATE MARK (SENSORY) | ○ | ○ | ○ | ○ |

Fig. 9

|  | EXAMPLE 6 | COMPARATIVE EXAMPLE 4 |
|---|---|---|
| POLYPROPYLENE | 46.5 | 50 |
| GLASS FIBER | - | - |
| GLASS FLAKES | 50 | 50 |
| WOLLASTONITE | - | - |
| STYRENE ELASTOMER | 3.5 | - |
| FLEXIBILITY RATIO (BASED ON THE FLEXIBILITY OF THE COMPARATIVE EXAMPLE BEING EXPRESSED AS 100) | 101 | 100 |
| BUCKLING STRENGTH (EVALUATION) | ◎ | ◎ |
| DETACHABILITY (SENSORY) | 9 | 9 |
| GATE MARK (SENSORY) | ○ | ○ |

Fig. 10

|  | EXAMPLE 7 | COMPARATIVE EXAMPLE 5 |
|---|---|---|
| POLYPROPYLENE | 41.5 | 45 |
| GLASS FIBER | - | - |
| GLASS FLAKES | - | - |
| WOLLASTONITE | 55 | 55 |
| STYRENE ELASTOMER | 3.5 | - |
| FLEXIBILITY RATIO (BASED ON THE FLEXIBILITY OF THE COMPARATIVE EXAMPLE BEING EXPRESSED AS 100) | 101 | 100 |
| BUCKLING STRENGTH (EVALUATION) | ◎ | ◎ |
| DETACHABILITY (SENSORY) | 9 | 9 |
| GATE MARK (SENSORY) | ○ | ○ |

Fig. 11

| | PRODUCTION EXAMPLE 1 | PRODUCTION EXAMPLE 2 | PRODUCTION EXAMPLE 3 | PRODUCTION EXAMPLE 4 | PRODUCTION EXAMPLE 5 | PRODUCTION EXAMPLE 6 | PRODUCTION EXAMPLE 7 | PRODUCTION EXAMPLE 8 | PRODUCTION EXAMPLE 9 |
|---|---|---|---|---|---|---|---|---|---|
| POLYPROPYLENE (HOMOPOLYMER) | 56.5 | 60 | 75 | 68 | 72 | 76.5 | 66.5 | 59 | 56.5 |
| POLYSTYRENE | - | - | - | - | - | - | - | - | - |
| POLYBUTYLENE TEREPHTHALATE | - | - | - | - | - | - | - | - | - |
| ABS | - | - | - | - | - | - | - | - | - |
| GLASS FIBER | 40 | 30 | - | - | - | - | - | - | - |
| ARAMID FIBER | - | - | 20 | - | - | - | - | - | - |
| CARBON FIBER | - | - | - | 30 | - | - | - | - | - |
| NANOCELLULOSE FIBER | - | - | - | - | 25 | - | - | - | - |
| MICA | - | - | - | - | - | 20 | 30 | 40 | 40 |
| GLASS FLAKES | - | - | - | - | - | - | - | - | - |
| WOLLASTONITE | - | - | - | - | - | - | - | - | - |
| POTASSIUM TITANATE | - | - | - | - | - | - | - | - | - |
| POLYPROPYLENE (RANDOM POLYMER) | - | 10 | - | - | - | - | - | - | - |
| STYRENE ELASTOMER | 3.5 | - | 5 | 2 | 3 | 3.5 | 3.5 | 1 | 3.5 |

| | PRODUCTION EXAMPLE 10 | PRODUCTION EXAMPLE 11 | PRODUCTION EXAMPLE 12 | PRODUCTION EXAMPLE 13 | PRODUCTION EXAMPLE 14 | PRODUCTION EXAMPLE 15 | PRODUCTION EXAMPLE 16 | PRODUCTION EXAMPLE 17 | PRODUCTION EXAMPLE 18 |
|---|---|---|---|---|---|---|---|---|---|
| POLYPROPYLENE (HOMOPOLYMER) | 50 | 76.5 | 66.5 | 56.5 | 36.5 | 67 | 66.5 | 61.5 | 61 |
| POLYSTYRENE | - | - | - | - | - | - | - | - | - |
| POLYBUTYLENE TEREPHTHALATE | - | - | - | - | - | - | - | - | - |
| ABS | - | - | - | - | - | - | - | - | - |
| GLASS FIBER | - | - | - | - | - | - | 10 | - | 10 |
| ARAMID FIBER | - | - | - | - | - | - | - | 20 | - |
| CARBON FIBER | - | - | - | - | - | - | - | - | 5 |
| NANOCELLULOSE FIBER | - | - | - | - | - | - | - | - | - |
| MICA | 40 | - | - | - | - | - | 20 | - | - |
| GLASS FLAKES | - | 20 | 30 | - | - | - | - | 15 | - |
| WOLLASTONITE | - | - | - | 40 | 60 | - | - | - | 20 |
| POTASSIUM TITANATE | - | - | - | - | - | 30 | - | - | - |
| POLYPROPYLENE (RANDOM POLYMER) | - | - | - | - | - | - | - | - | - |
| STYRENE ELASTOMER | 10 | 3.5 | 3.5 | 3.5 | 3.5 | 3 | 3.5 | 3.5 | 4 |

Fig. 12

| | PRODUCTION EXAMPLE 19 | PRODUCTION EXAMPLE 20 | PRODUCTION EXAMPLE 21 | PRODUCTION EXAMPLE 22 | PRODUCTION EXAMPLE 23 | PRODUCTION EXAMPLE 24 | PRODUCTION EXAMPLE 25 |
|---|---|---|---|---|---|---|---|
| POLYPROPYLENE (HOMOPOLYMER) | - | - | - | - | - | - | - |
| POLYSTYRENE | 66.5 | 66.5 | 76.5 | 81.5 | - | - | - |
| POLYBUTYLENE TEREPHTHALATE | - | - | - | - | 66.5 | 78 | 71.5 |
| ABS | - | - | - | - | - | - | - |
| GLASS FIBER | 30 | - | - | - | 30 | - | - |
| ARAMID FIBER | - | - | - | - | - | 20 | - |
| CARBON FIBER | - | - | - | - | - | - | 25 |
| NANOCELLULOSE FIBER | - | - | - | - | - | - | - |
| MICA | - | 30 | - | - | - | - | - |
| GLASS FLAKES | - | - | 20 | - | - | - | - |
| WOLLASTONITE | - | - | - | - | - | - | - |
| POTASSIUM TITANATE | - | - | - | 15 | - | - | - |
| POLYPROPYLENE (RANDOM POLYMER) | - | - | - | - | - | - | - |
| STYRENE ELASTOMER | 3.5 | 3.5 | 3.5 | 3.5 | 3.5 | 2 | 3.5 |

| | PRODUCTION EXAMPLE 26 | PRODUCTION EXAMPLE 27 | PRODUCTION EXAMPLE 28 | PRODUCTION EXAMPLE 29 | PRODUCTION EXAMPLE 30 | PRODUCTION EXAMPLE 31 |
|---|---|---|---|---|---|---|
| POLYPROPYLENE (HOMOPOLYMER) | - | - | - | - | - | - |
| POLYSTYRENE | - | - | - | - | - | - |
| POLYBUTYLENE TEREPHTHALATE | 88 | 71.5 | 57 | - | - | - |
| ABS | - | - | - | 60 | 60 | 70 |
| GLASS FIBER | - | - | - | 10 | 20 | - |
| ARAMID FIBER | - | - | - | - | - | - |
| CARBON FIBER | - | - | - | - | - | - |
| NANOCELLULOSE FIBER | 10 | - | - | - | - | - |
| MICA | - | - | - | - | - | - |
| GLASS FLAKES | - | 25 | - | - | - | 10 |
| WOLLASTONITE | - | - | 40 | - | - | - |
| POTASSIUM TITANATE | - | - | - | - | - | - |
| POLYPROPYLENE (RANDOM POLYMER) | - | - | - | 30 | 10 | 20 |
| STYRENE ELASTOMER | 2 | 3.5 | 3 | - | 10 | - |

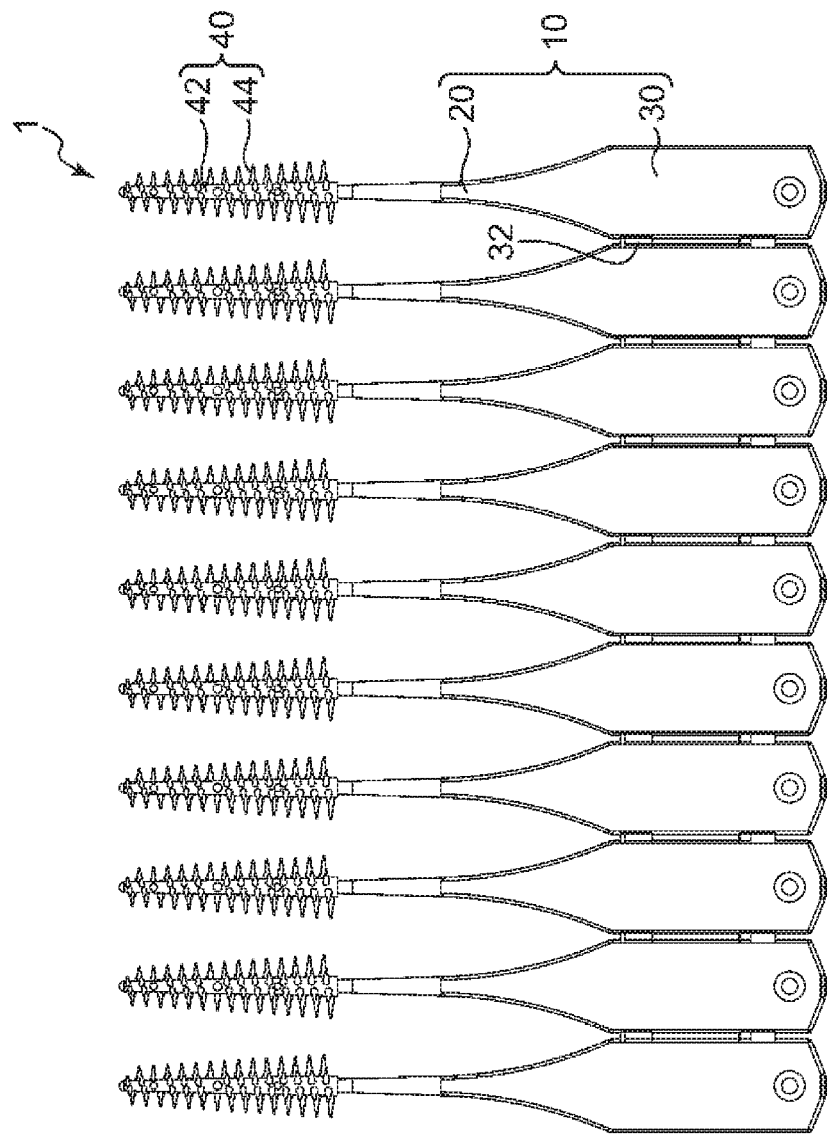

INTERDENTAL CLEANING TOOL

CROSS-REFERENCE TO RELATED APPLICATIONS

This application is a National Stage filing under 35 U.S.C. § 371 of International Application No. PCT/JP2016/087489, filed on Dec. 16, 2016, which claims priority to Japanese Application Number 2015-247483, filed on Dec. 18, 2015, the contents of each of which are incorporated herein by reference in their entireties.

TECHNICAL FIELD

The present invention relates to an interdental cleaning tool.

BACKGROUND ART

An interdental cleaning tool for cleaning interdental spaces is conventionally known. For example, Patent Document 1 discloses an interdental cleaning tool including: a base having a shape extending in a particular direction; and a cleaner made of an elastomer. The base includes: a shaft having a shape to be inserted into an interdental space; and a grip having a shape to be gripped by fingers. The cleaner has a shape that covers part (including a distal end) of an outer peripheral surface of the shaft.

The base is formed of a composite material including a synthetic resin (polypropylene, etc.) and a reinforcement material (glass fiber, etc.), the composite material being a material obtained by adding a fibrous reinforcement material to the synthetic resin. The reinforcement material is added for the purpose of enhancing the strength (in particular, buckling load) of the shaft.

In the interdental cleaning tool disclosed in Patent Document 1, although the buckling load of the shaft has been greatly enhanced by adding the enhancement to the synthetic resin, the shaft is relatively likely to be fractured when a bending load in a direction of bending the shaft acts on the shaft.

CITATION LIST

Patent Document

Patent Document 1: WO2013/176297

SUMMARY

An object of the present invention is to provide an interdental cleaning tool capable of inhibiting the fracture of a shaft.

An interdental cleaning tool according to an aspect of the present invention comprises a base having a shaft that has a shape to be inserted into an interdental space, wherein the base is formed of a composite material comprising a synthetic resin, a reinforcement material and a low-hardness resin having a lower hardness than a hardness of the synthetic resin.

BRIEF DESCRIPTION OF DRAWINGS

FIG. 6 is a table showing compositions of Example 1 and Comparative Example 1, as well as results of various tests.

FIG. 7 is a table showing compositions of Example 2 and Comparative Example 2, as well as results of various tests.

FIG. 8 is a table showing compositions of Examples 3-5 and Comparative Example 3, as well as results of various tests.

FIG. 9 is a table showing compositions of Example 6 and Comparative Example 4, as well as results of various tests.

FIG. 10 is a table showing compositions of Example 7 and Comparative Example 5, as well as results of various tests.

FIG. 11 is a table showing compositions of various production examples.

FIG. 12 is a table showing compositions of various production examples.

FIG. 14 is a front view showing another modification of the interdental cleaning tool shown in FIG. 1.

DESCRIPTION OF EMBODIMENTS

Figure 1:
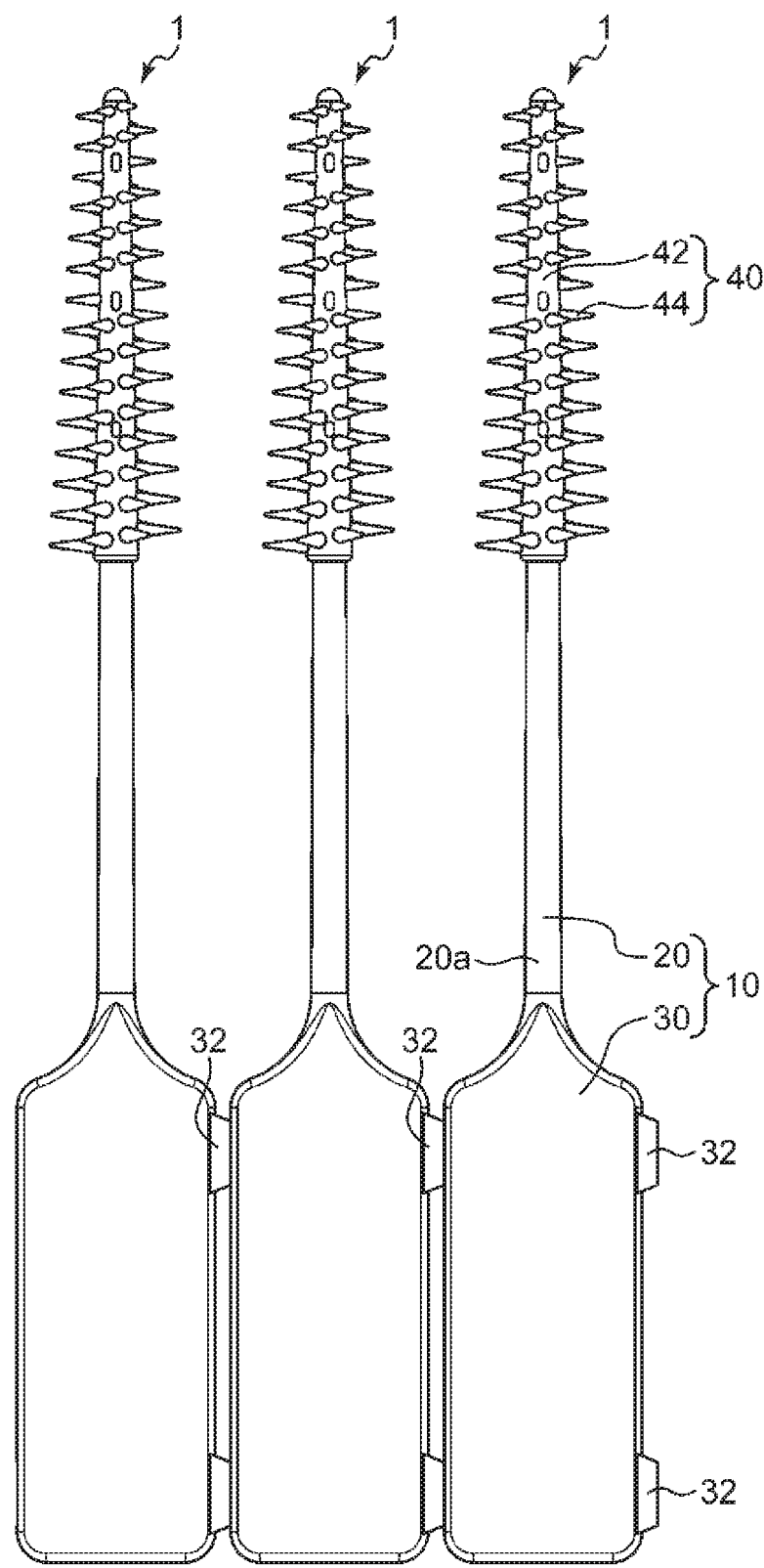
FIG. 1 is a front view of an interdental cleaning tool according to an embodiment of the present invention.

An interdental cleaning tool 1 according to an embodiment of the present invention will be described below with reference to FIG. 1. FIG. 1 shows a group of interdental cleaning tools having a plurality (in FIG. 3, three) of interdental cleaning tools 1. The interdental cleaning tool 1 includes a base 10 and a cleaner 40.

The base 10 has a shaft 20 and a grip 30.

The shaft 20 extends linearly along a particular direction (an up and down direction in FIG. 1) and has a shape to be inserted into an interdental space. The shaft 20 includes: a base end 20a connected to the grip 30; and a distal end, being an end to be inserted into the interdental space. In the present embodiment, the shaft 20 is formed in a columnar shape with its outer diameter gradually decreasing from the base end 20a thereof toward the insertion end thereof.

The grip 30 extends from the base end 20a of the shaft 20 so as to be away from the shaft 20 along the axial direction of the shaft 20. The grip 30 has a flat shape to be gripped by fingers. Adjacent grips 30 are connected to each other by a pair of connecting portions 32. Each connecting portion 32 is preferably thinner than the grip 30. Each connecting portion 32 is preferably formed so as to gradually become thinner toward the adjacent grip 30. Such shape allows the grips 30 to be easily detached from each other at the connecting portions 32, while inhibiting the grips 30 from being detached from each other due to impacts during transportation. The connecting portion 32 is preferably formed such that a boundary portion between the connecting portion 32 and a grip 30 on one side of the connecting portion 32 is thinner than a boundary portion between the connecting portion 32 and another grip 30 on the other side of the connecting portion 32.

The base 10 is formed of a composite material containing a synthetic resin, a reinforcement material and a low-hardness resin having a lower hardness than the hardness of the synthetic resin.

Preferable examples of the synthetic resin include thermoplastic resins such as polypropylene, polyethylene, ABS, polybutylene terephthalate, polycarbonate, polyethylene terephthalate, polystyrene and polyacetal. In terms of enhancing the buckling strength of the shaft 20 while securing the flexibility thereof, the synthetic resin is preferably a polypropylene, among which a homopolymer polypropylene is more preferable. In the present embodiment, a homopolymer polypropylene is used as the synthetic resin.

Preferable examples of the reinforcement material may include a fibrous reinforcement material, a needle-like reinforcement material, a plate-like reinforcement material and a granular reinforcement material. The length of the fibrous reinforcement material is typically from 50 µm to 450 µm in the state contained in the synthetic resin. Preferable examples of the fibrous reinforcement material may include glass fiber, aramid fiber, carbon fiber, cellulose fiber and nanocellulose fiber. As the fibrous reinforcement material, glass fiber is more preferably used due to its capability of effectively increasing the buckling load of the shaft 20. The length (the dimension at the longest portion) of the needle-like reinforcement material is typically from 20 µm to 90 µm in the state contained in the synthetic resin. A preferable example of the needle-like reinforcement material may include wollastonite. The length of the plate-like reinforcement material is typically from 10 µm to 150 µm in the state contained in the synthetic resin. Preferable examples of the plate-like reinforcement material may include mica, glass flakes and talc. The length of the granular reinforcement material is typically from 5 µm to 40 µm in the state contained in the synthetic resin.

In terms of enhancing the buckling strength of the shaft 20 while securing the flexibility thereof, the reinforcement material is preferably treated with at least one of a coupling agent and an adhesive, and more preferably treated with both the coupling agent and the adhesive. Such treatment is particularly preferable when the glass flakes are used as the reinforcement material. Examples of the coupling agent may include silane coupling agent, titanium-based coupling agent, aluminum-based coupling agent and zirconia-based coupling agent. Examples of the adhesive may include vinyl acetate resin, acrylic resin, polyester resin, polyether resin, phenoxy resin, polyamide resin, epoxy resin, polyolefin resin, methylcellulose, carboxymethylcellulose, starch, carboxymethyl starch, hydroxyethylcellulose, hydroxypropylcellulose and polyvinyl alcohol.

The content of the reinforcement material in the composite material is typically set to 10% by weight or more and 60% by weight or less, in terms of obtaining satisfactory levels of buckling strength and flexibility. When the reinforcement material is glass fiber, the content is preferably 10% by weight or more and 40% by weight or less, and more preferably 10% by weight or more and 30% by weight or less. When the reinforcement material is glass flakes, the content is preferably 10% by weight or more and 50% by weight or less, more preferably 20% by weight or more and 50% by weight or less and, in terms of obtaining particularly excellent flexibility, further preferably 20% by weight or more and 40% by weight or less, and particularly preferably 20% by weight or more and 30% by weight or less. When the reinforcement material is wollastonite, the content is preferably 20% by weight or more and 60% by weight or less, and more preferably 30% by weight or more and 60% by weight or less. When the reinforcement material is mica, the content is preferably 10% by weight or more and 45% by weight or less, more preferably 20% by weight or more and 40% by weight or less, and further preferably 20% by weight or more and 30% by weight or less in terms of obtaining particularly excellent flexibility.

In terms of obtaining satisfactory levels of buckling strength and flexibility, the low-hardness resin is preferably formed of polypropylenes such as a random polymer of polypropylene and a block polymer of polypropylene, polyethylene such as linear low-density polyethylene and low-density polyethylene, elastomer such as styrene elastomer, olefin elastomer and polyester elastomer, and silicone, among which elastomer such as styrene elastomer, olefin elastomer and polyester elastomer, as well as silicone, are more preferable and styrene elastomer is further preferable. In the present embodiment, styrene elastomer is used as the low-hardness resin. The Shore A hardness of such elastomer is preferably from 20 to 50. The hardness of the low-hardness resin may only be required to be lower than the hardness of the synthetic resin used for the base 10. For example, if a homopolymer polypropylene is used as the synthetic resin, a random polymer polypropylene having a hardness lower than that of the homopolymer polypropylene serves as the low-hardness resin.

The content of the low-hardness resin in the composite material is set to 1% by weight or more and 30% by weight or less, in terms of obtaining a satisfactory level of buckling strength, while obtaining flexibility. With the content of the low-hardness resin of 1% by weight or more, it can be sufficiently expected that the flexibility of the shaft 20 containing the low-hardness resin can be improved, while with the content of 30% by weight or less, a sufficient buckling strength of the shaft 20 can be obtained. Such content is preferably set to 1% by weight or more and 20% by weight or less, more preferably 1% by weight or more and 10% by weight or less, and further preferably 1% by weight or more and 5% by weight or less. In particular, when the low-hardness resin is elastomer, the content thereof is preferably 20% by weight or less in terms of securing a sufficient buckling strength of the shaft 20.

The cleaner 40 covers the outer peripheral surface of the shaft 20, while being capable of cleaning interdental spaces. The cleaner 40 includes a cleaner body 42 that covers the outer peripheral surface of the shaft 20, and a plurality of brush bristles 44 each projected from the outer peripheral surface of the cleaner body 42. The cleaner 40 is formed of elastomer. In the present embodiment, the same resin as the low-hardness resin (styrene elastomer) is used as the elastomer for the cleaner 40. Such configuration is preferable since it can enhance the compatibility between the cleaner 40 and the shaft 20. In addition, if polypropylene is employed as the synthetic resin, the styrene elastomer is also preferable due to its excellent compatibility with the polypropylene.

Next, a manufacturing method of the interdental cleaning tool 1 will be described below. The manufacturing method includes a kneading step, a base forming step and a cleaner forming step.

In the kneading step, the synthetic resin, reinforcement material and low-hardness resin are kneaded in a kneader to form the composite material. In the present embodiment, since the content of the reinforcement material in the composite material is set to 60% by weight or less, the synthetic resin, reinforcement material and low-hardness resin can be kneaded uniformly. Part of wollastonite is crushed in the kneading step so as to bring it from a needle-like form into a granular form.

In the base forming step, the base 10 is formed by injecting the composite material into a base forming mold (not shown) with a space having a shape corresponding to the shape of the base 10, from a side corresponding to the grip 30 toward a side corresponding to the shaft 20. In the present embodiment, since the reinforcement material is added to the synthetic resin, a gate mark of the base 10 is inhibited from being formed in a pointed shape. Thus, if the gate mark is touched by, for example, a finger, the pain and stimuli that the finger will receive can be reduced.

In the cleaner forming step, the cleaner 40 is formed by injecting the same resin as the low-hardness resin (elastomer) into a cleaner forming mold (not shown) with a space capable of forming the cleaner 40 around the shaft 20.

Next, the following description will describe an interdental cleaning method using the interdental cleaning tool 1.

First, the interdental cleaning tool 1 is inserted into an interdental space from the distal end of the shaft 20. The grip 30 is then operated so that the cleaner 40 moves back and forth along the interdental space. At this time, although a bending load may act on the shaft 20, since the shaft 20 of the interdental cleaning tool 1 according to the present embodiment is flexible, the shaft 20 is inhibited from being fractured. Specifically, since the composite material contains the low-hardness resin having a lower hardness than the hardness of the synthetic resin in the interdental cleaning tool 1, the buckling strength of the shaft 20 can be maintained while securing the flexibility of the shaft 20. More specifically, the reinforcement material enhances the buckling strength of the shaft 20 and the low-hardness resin enhances the toughness of the shaft 20 which would otherwise decrease due to the addition of the enhancement. Accordingly, both the buckling strength and the flexibility of the shaft 20 can be secured.

The content of the low-hardness resin in the composite material is 1% by weight or more and 30% by weight or less, and such content ensures that that the flexibility and an effective buckling strength of the shaft 20 can be secured. Specifically, the content of the low-hardness resin of 1% by weight or more further ensures that the flexibility of the shaft 20 can be secured and the content of the low-hardness resin of 30% by weight or less maintains the buckling strength of the shaft 20.

The content of the enhancement in the composite material is 10% by weight or more and 60% by weight or less, and such content further ensures that both the buckling strength and the flexibility of the shaft 20 can be secured. Specifically, the content of the enhancement of 10% by weight or more secures the buckling strength of the shaft 20. The content of the reinforcement material of 60% by weight or less inhibits the reinforcement material from acting as a resistance against the bending of the shaft 20 and therefore secures the flexibility of the shaft 20.

In the present embodiment, the elastomer forming the cleaner 40 is the same resin as the low-hardness resin. With such configuration, since the compatibility between the cleaner 40 and the shaft 20 which are formed of elastomer can be enhanced, the peeling of the cleaner 40 from the shaft 20 can be inhibited.

It should be noted that the above embodiment disclosed herein should be considered illustrative, but not limiting, in every respect. The scope of the present invention is defined by the scope of the claims, without being defined by the above descriptions of the embodiment, and encompasses all modifications within the meanings and the scope of the claims and the equivalents thereof.

For example, the low-hardness resin contained in the composite material and the elastomer forming the cleaner 40 may be different resins. The cleaner 40 may be omitted.

Figure 13:
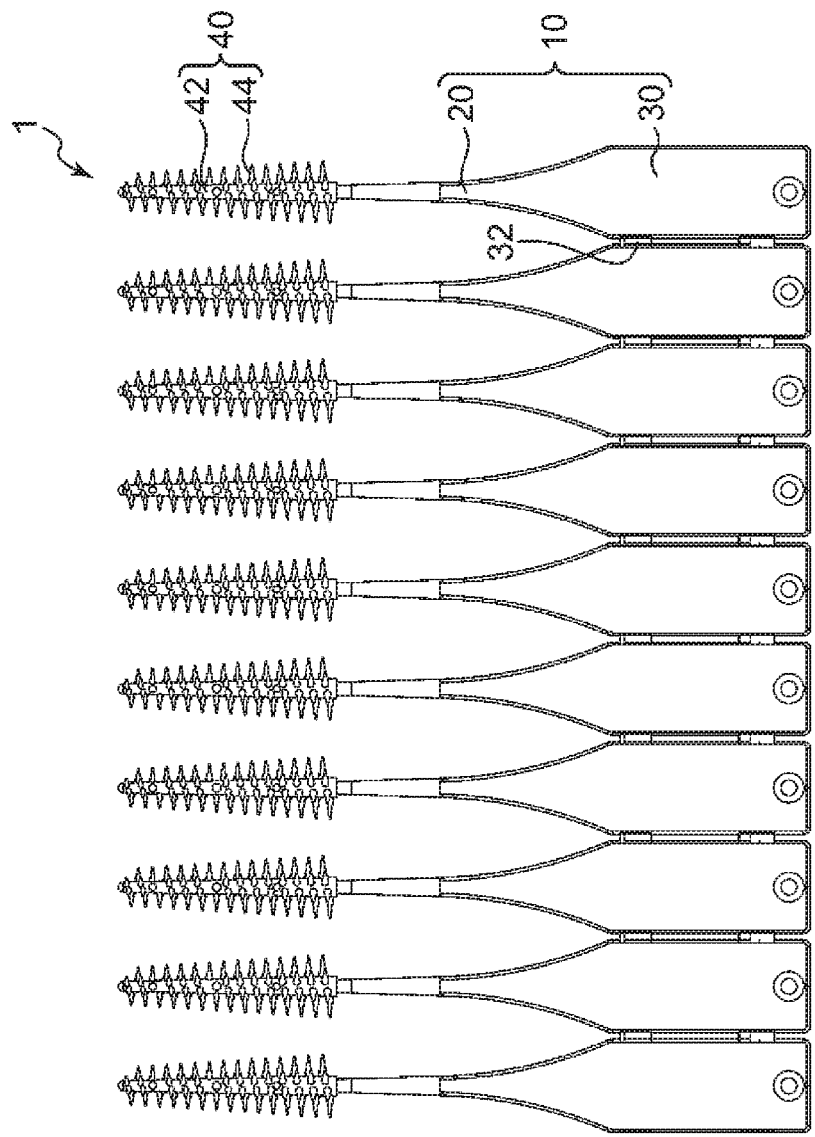
FIG. 13 is a front view showing a modification of the interdental cleaning tool shown in FIG. 1.

The shaft 20 may be curved. The grip 30 may be omitted. As shown in FIGS. 13 and 14, the shape of the base 10 may be modified as appropriate.

EXAMPLES

Regarding the interdental cleaning tool 1 according to the above embodiment, seven types of Examples were prepared and five types of Comparative Examples were prepared as comparisons to the above-mentioned Examples. The compositions of the respective Examples and Comparative Examples are shown in FIGS. 6-10. The units of the synthetic resin, the reinforcement material and the low-hardness resin (elastomer) shown in each table is "% by weight." It should be noted that the glass fiber is available from Asahi Fiber Glass Co., Ltd., Nitto Boseki Co., Ltd., Central Glass Co., Ltd., etc., the glass flakes are available from Nippon Sheet Glass Co., Ltd., etc., and the wollastonite is available from Kansai Matec Co., Ltd., Keiwa Rozai Co., Ltd., Marutou Co., Ltd., etc. FIGS. 6-10 show the results of four tests conducted on the Examples and the Comparative Examples: (1) the flexibility of the shaft 20; (2) the buckling strength (buckling load) of the shaft 20; (3) gate marks; and (4) detachability. The following description will describe the test method and test result of each test.

(1) Flexibility of Shaft 20

Figure 2:
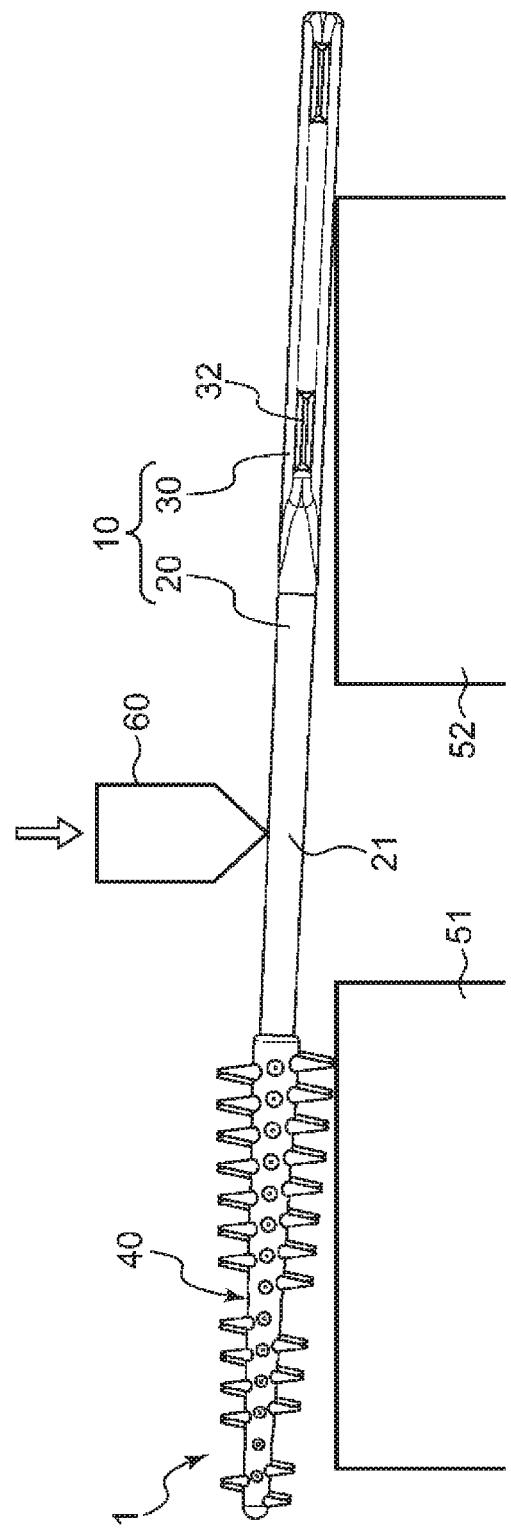
FIG. 2 is a diagram illustrating a measurement method of the flexibility of a shaft of the interdental cleaning tool shown in FIG. 1.
Figure 3:
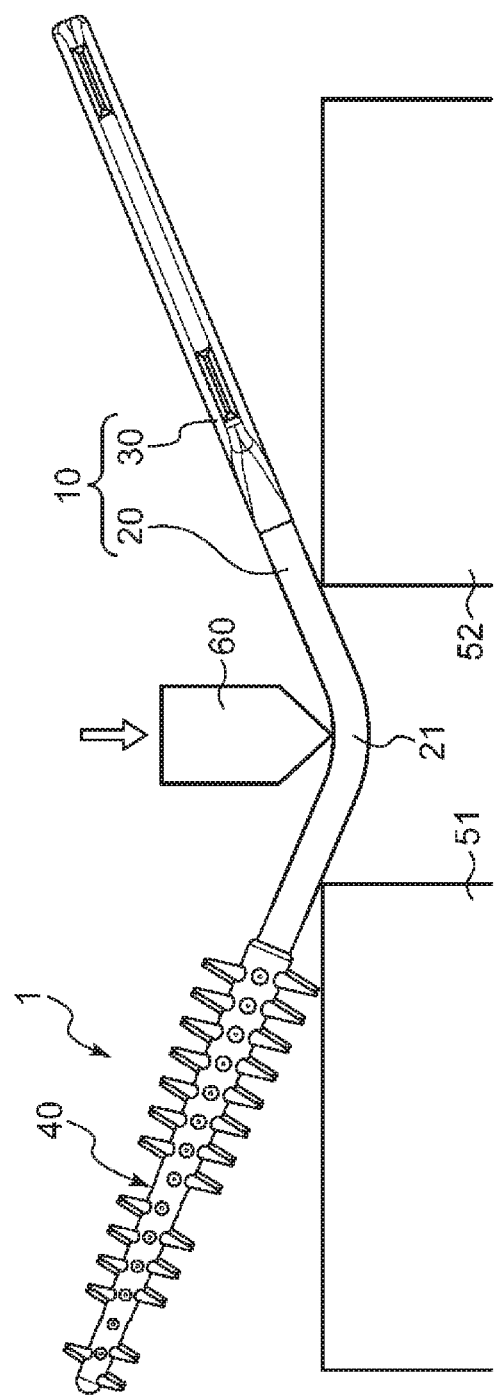
FIG. 3 is a diagram illustrating a measurement method of the flexibility of a shaft of the interdental cleaning tool shown in FIG. 1.

As shown in FIGS. 2 and 3, this measurement was conducted by using a first table 51, a second table 52 and a presser 60, with the first table 51 and the second table 52 being spaced apart from each other in the horizontal direction. The gap between the first table 51 and the second table 52 was set to 10 mm. A lower end of the presser 60 was formed into a pointed shape. Specifically, this measurement was conducted as follows: an interdental cleaning tool 1 was placed on the first table 51 and the second table 52, a lower end of the presser 60 was brought into contact with a central portion 21 of the shaft 20, located at the center between the first table 51 and the second table 52, and then the central portion 21 was pressed downwardly by the presser 60 at 10 mm/min.

Figure 4:
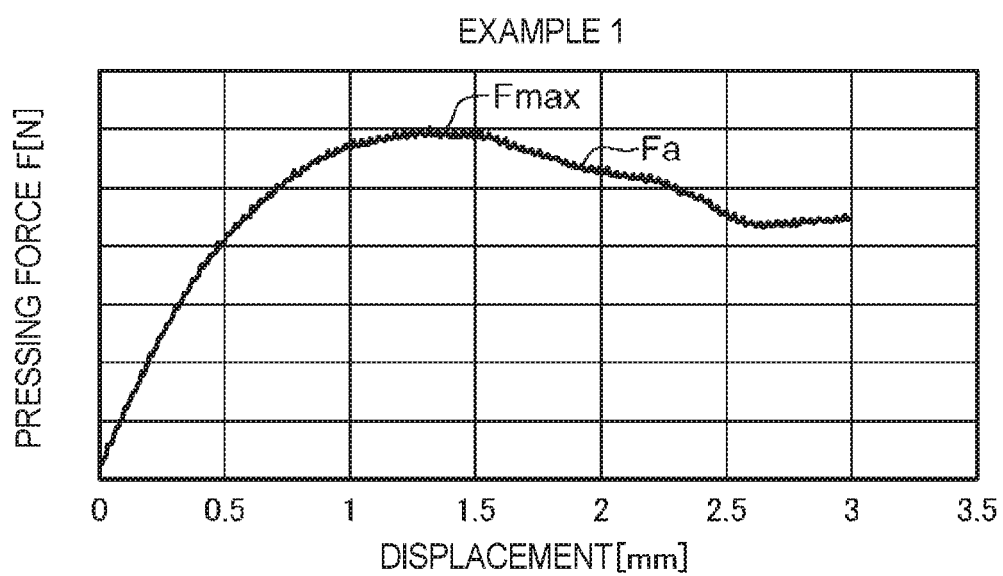
FIG. 4 is a graph showing the relationship between a displacement of a pressing tool and its pressing force in Example 1.
Figure 5:
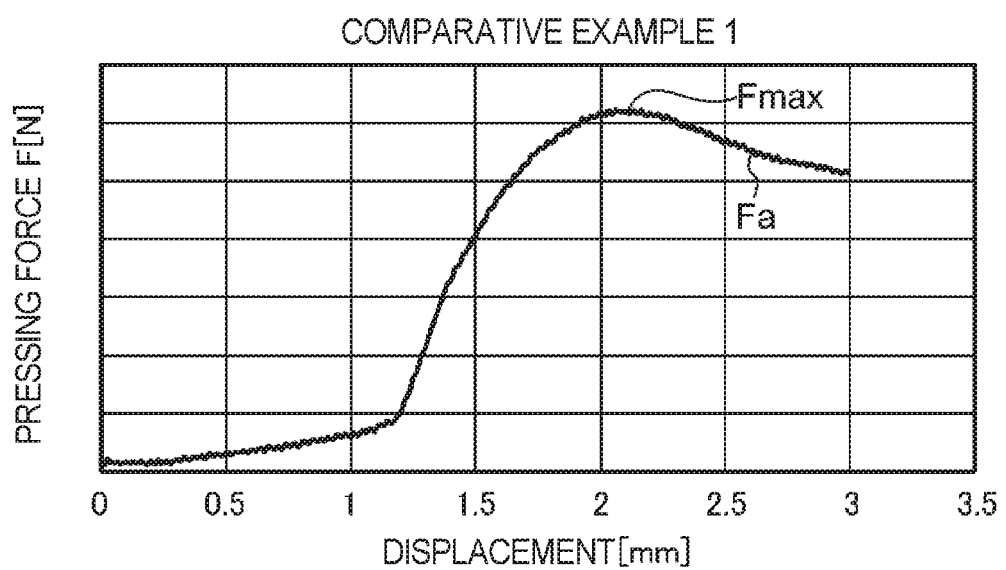
FIG. 5 is a graph showing the relationship between a displacement of a pressing tool and its pressing force in Comparative Example 1.

FIGS. 4 and 5 show the results of this test. FIG. 4 is a graph showing the test result of Example 1, and FIG. 5 shows the test result of Comparative Example 1. FIGS. 4 and 5 indicate that: in Example 1, a pressing force F of the presser 60 gradually varied after it reached the maximum pressing force Fmax, being the maximum value of the pressing force F during the measurement, whereas in Comparative Example 1, the pressing force F of the presser 60 rapidly decreased after it reached the maximum pressing force Fmax (which means that the shaft 20 was fractured). It should be noted that the pressing force F was measured by AUTOGRAPH AGS-J 1kN (manufactured by Shimadzu Corporation) and a force gage attachment (A-type S-4, manufactured by Imada Co., Ltd.) was used as the presser 60.

Here, the flexibility was calculated based on the maximum pressing force Fmax and a post-displacement pressing force Fa as measured when the presser 60 was displaced downwardly by 0.5 mm from the position of the presser 60 where the maximum pressing force Fmax was obtained. Specifically, the flexibility was calculated based on the following equation.

Flexibility=(Post-displacement pressing force $Fa$/Maximum pressing force $F$max)×100

FIGS. 6-10 show a ratio of flexibility of the shaft 20 in each Example to the flexibility of the shaft 20 in its counterpart Comparative Example (hereinafter referred to as the "flexibility ratio"). Such flexibility ratio is expressed by a value representing the flexibility of the shaft 20 in each Example based on the flexibility of the shaft 20 in the Comparative Example in each drawing being expressed as 100. The greater such value is with respect to 100, the more flexible the shaft 20 of each Example is evaluated as compared to the flexibility of the shaft 20 in the counterpart Comparative Example. FIGS. 6-10 each show the result of comparison where the content (% by weight) of the reinforcement material in the composite material is the same between the Example(s) and the Comparative Example(s).

(2) Buckling Strength (Buckling Load) of Shaft 20

The buckling load was measured by fixing the grip 30 such that the shaft 20 is parallel to the vertical direction and then pressing the distal end of the shaft 20 downwardly in the vertical direction using AUTOGRAPH AGS-J 1kN (manufactured by Shimadzu Corporation). The symbols shown in FIGS. 6-10 represent the following criteria.

⊚: The buckling load is 2.2 N or more, and the cleaner 40 is easily insertable into both the interdental spaces between front teeth and between back teeth.

○: The buckling load is 2.0 N or more and less than 2.2 N, and the cleaner 40 is sufficiently insertable into both the interdental spaces between the front teeth and between the back teeth.

Δ: The buckling load is 1.6 N or more and less than 2.0 N, and the cleaner 40 is insertable into the interdental space between the front teeth but is sometimes difficult to be inserted into the interdental space between the back teeth. (It should be noted that there is no "Δ" symbol in Tables 6-10.)

x: The buckling load was less than 1.6 N, and the cleaner 40 was difficult to be inserted into both the interdental spaces between the front teeth and between the back teeth. (It should be noted that there is no "x" symbol in Tables 6-10.)

(3) Gate Mark

Based on the following criteria, the stimuli that the ten subjects felt when they touched each gate mark with their fingers was evaluated as follows.

○: No subject felt any stimuli.

Δ: 1-6 subjects felt stimuli.

x: 7-10 subjects felt stimuli.

(4) Detachability

Detachability during the process of detaching a particular interdental cleaning tool 1 (e.g., the rightmost interdental cleaning tool 1) in a group of interdental cleaning tools from an adjacent interdental cleaning tool 1 was evaluated. The detachability was evaluated by conducting a questionnaire using a Visual Analogue Scale in which the detachability was rated from 0 (difficult to be detached at the connecting portion 32) to 10 (easily detachable at the connecting portion 32). FIGS. 6-12 each show the mean value of the results of the questionnaire from the ten subjects, the mean value being rounded off to the nearest whole number.

The results of the above four tests are shown in FIGS. 6-10. FIGS. 6-10 show that the flexibility in every Example was better than that of the counterpart Comparative Example. Although not shown in the drawings, the flexibility of a shaft of an interdental cleaning tool which was formed of a composite material in which only styrene elastomer was added to polypropylene and no reinforcement material was added thereto, was verified to be lower than the flexibility of a shaft of an interdental cleaning tool which was formed only of polypropylene. In other words, it can be inferred that the low-hardness resin (elastomer) provides an effect of enhancing the toughness of the shaft 20 when added to a synthetic resin to which a reinforcement material has been added.

The comparison between Examples 3-5 verified that the flexibility increases as the content of the low-hardness resin (elastomer) in the composite material increases.

A satisfactory level of buckling strength was obtained in every Example and a more satisfactory level of buckling strength was obtained in Examples 2-7. In particular, although not shown in FIGS. 6-10, the buckling load was more than 2.5 N in each of Examples 2-7, indicating that even better insertion into the interdental spaces could be achieved.

No subjects felt stimuli when touching the gate mark in all of the Examples and the Comparative Examples.

A satisfactory level of detachability could be obtained in every Example.

Although not shown in FIGS. 6-10, the adhesiveness between the shaft 20 and the cleaner 40 was also tested, where ten subjects used the interdental cleaning tool according to each Example and each Comparative Example. As a result, no peeling of the cleaner 40 from the shaft 20 occurred in any of the Examples and Comparative Examples, which demonstrates that the shaft 20 has excellent compatibility with the cleaner 40.

The above tests demonstrate that, by adding both the enhancement and the low-hardness resin to the synthetic resin, it is possible to obtain an interdental cleaning tool having a shaft 20 with excellent flexibility while securing a satisfactory level of buckling strength.

Similar effects to the above-mentioned effects could also be observed in production examples 1-31 shown in FIGS. 11 and 12.

The embodiment described above encompasses an invention having the following configurations.

The interdental cleaning tool according to the present embodiment includes a base that has a shaft having a shape to be inserted into interdental spaces, the base being formed of a composite material that includes a synthetic resin, a reinforcement material and a low-hardness resin having a lower hardness than the hardness of the synthetic resin.

In such interdental cleaning tool, since the composite material includes the low-hardness resin having a lower hardness than the hardness of the synthetic resin, the flexibility of the shaft is secured while maintaining the buckling strength of the shaft. Specifically, the reinforcement material enhances the buckling load of the shaft, while the low-hardness resin enhances the toughness of the shaft which would otherwise decrease due to the addition of the reinforcement material. Accordingly, both the buckling strength and the flexibility of the shaft can be secured. Examples of the reinforcement material may include a fibrous reinforcement material, a needle-like reinforcement material, a plate-like reinforcement material and a granular reinforcement material.

Examples of the fibrous reinforcement material may include glass fiber, aramid fiber, carbon fiber, cellulose fiber, nanocellulose fiber, vinylon fiber, alumina fiber and metallic fiber. Examples of the needle-like reinforcement material may include wollastonite, asbestos, potassium titanate, xonotlite, phosphate fiber, dawsonite, needle-like MgO, aluminum borate and needle-like magnesium hydroxide. Examples of the plate-like reinforcement material may include mica, glass flakes, plate-like talc, metal foils, graphite, plate-like calcium carbonate and plate-like aluminum hydroxide. Examples of the granular reinforcement material may include silica, granular calcium carbonate, clay, and glass beads.

In this case, the content of the low-hardness resin in the composite material is preferably 1% by weight or more and 30% by weight or less.

Such content further ensures that the flexibility and an effective buckling strength of the shaft are secured. Specifically, with the content of the low-hardness resin of 1% by weight or more, it can be further ensured that the flexibility of the shaft can be secured, while with the content of the low-hardness resin of 30% by weight or less, the buckling strength of the shaft can be maintained.

In the interdental cleaning tool, the content of the reinforcement material in the composite material is preferably 10% by weight or more and 60% by weight or less.

Such content can further ensure that the buckling strength of the shaft is maintained while the flexibility thereof is secured. Specifically, with the content of the reinforcement material of 10% by weight or more, the buckling strength of the shaft is maintained. The content of the reinforcement material of 60% by weight or less inhibits the reinforcement material from acting as a resistance against the bending of the shaft and therefore secures the flexibility of the shaft.

In the interdental cleaning tool, the reinforcement material may preferably be a fibrous reinforcement material.

Based on such aspect, the buckling load of the shaft is effectively enhanced. It should be noted that, although the degree of decrease in the toughness of the shaft due to the addition of the fibrous reinforcement material to the synthetic resin is greater than that due to the addition of the non-fibrous reinforcement material (such as needle-like reinforcement material, plate-like reinforcement material or granular reinforcement material) to the synthetic resin, this impact is negligible in view of the effect obtained by the addition of the low-hardness resin to the synthetic resin. Preferable examples of the fibrous reinforcement material may include glass fiber, aramid fiber, carbon fiber, cellulose fiber and nanocellulose fiber.

It is preferable for the interdental cleaning tool to further comprise a cleaner made of an elastomer, the cleaner covering the outer peripheral surface of the shaft while being capable of cleaning an interdental space, the elastomer being the same resin as the low-hardness resin.

With such configuration, since the compatibility between the cleaner and the shaft which are made of elastomer is enhanced, the peeling of the cleaner from the shaft can be inhibited.

What is claimed is:

1. An interdental cleaning tool, comprising:
    a base having a shaft and a grip located at a proximal end of the shaft, the shaft configured to be inserted into an interdental space, and
    a cleaner configured to clean the interdental space, the cleaner covering an outer peripheral surface of a distal portion of the shaft, the cleaner including a distalmost end and a proximalmost end located between the distalmost end and the grip,
    wherein the base is formed of a composite material comprising a synthetic resin, a reinforcement material and a low-hardness resin having a lower hardness than a hardness of the synthetic resin,
    wherein a content of the low-hardness resin in the composite material is 3.5% by weight or more and 10% by weight or less,
    wherein the reinforcement material is a fibrous reinforcement material, and
    wherein the shaft includes a central portion located between the proximalmost end of the cleaner and the grip, the central portion of the shaft being formed of the composite material.

2. The interdental cleaning tool according to claim 1, wherein a content of the reinforcement material in the composite material is 10% by weight or more and 60% by weight or less.

3. The interdental cleaning tool according to claim 1, wherein the cleaner is an elastomer is resin that is the same as the low-hardness resin.

4. The interdental cleaning tool according to claim 1, wherein the content of the low-hardness resin and the fibrous reinforcement material are configured to enhance the buckling strength and the flexibility of the shaft.

5. The interdental cleaning tool according to claim 1, wherein a length of the fibrous reinforcement material is between 50 µm and 450 µm in a state contained in the synthetic resin.

6. The interdental cleaning tool according to claim 1, wherein the fibrous reinforcement material includes a glass fiber, an aramid fiber, a carbon fiber, a cellulous fiber, and/or a nanocellulose fiber.

* * * * *

UNITED STATES PATENT AND TRADEMARK OFFICE
CERTIFICATE OF CORRECTION

PATENT NO. : 11,478,341 B2
APPLICATION NO. : 16/062683
DATED : October 25, 2022
INVENTOR(S) : Tasuku Kikkawa et al.

It is certified that error appears in the above-identified patent and that said Letters Patent is hereby corrected as shown below:

In the Claims

In Claim 3, Column 10, Line 32, replace "elastomer is resin" with --elastomer resin--.

Signed and Sealed this
Twenty-seventh Day of December, 2022

Katherine Kelly Vidal
Director of the United States Patent and Trademark Office